L. PODLASEK.
BOILER.
APPLICATION FILED SEPT. 28, 1917.
1,275,596.
Patented Aug. 13, 1918.
2 SHEETS—SHEET 1.
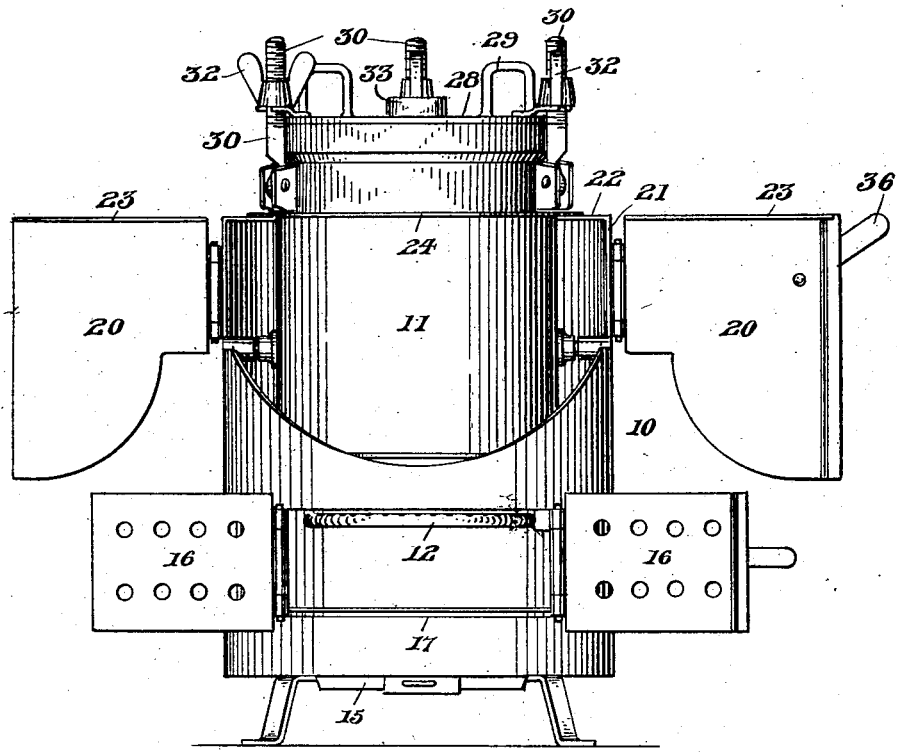
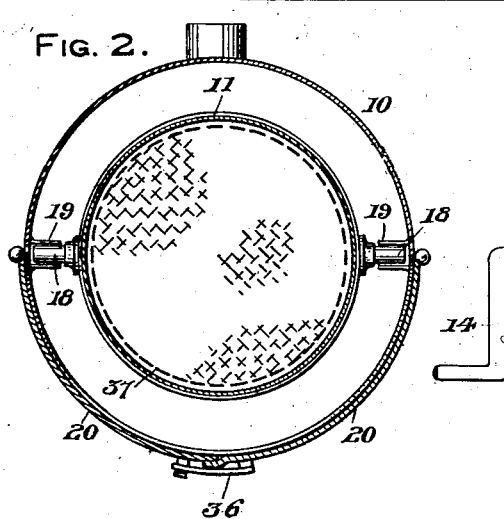
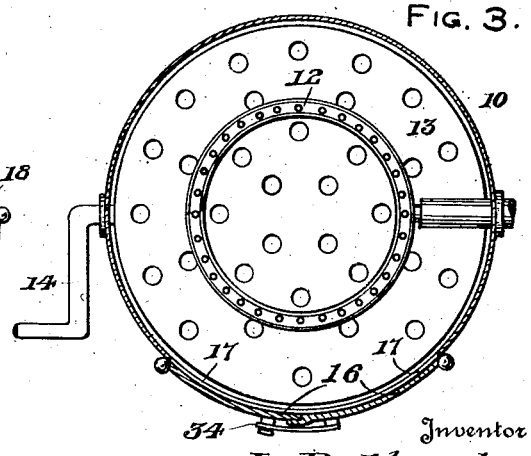
Inventor
L. Podlasek L. PODLASEK.
BOILER.
APPLICATION FILED SEPT. 28, 1917.
1,275,596.
Patented Aug. 13, 1918.
2 SHEETS—SHEET 2.
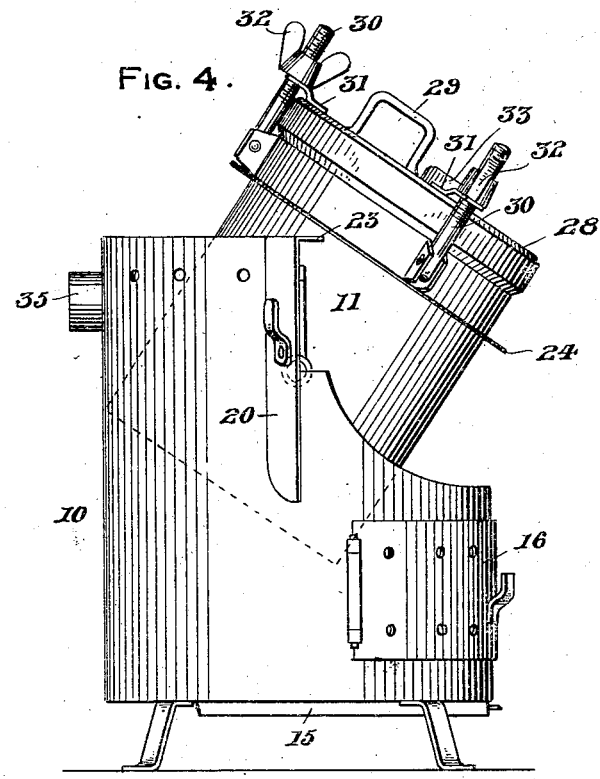
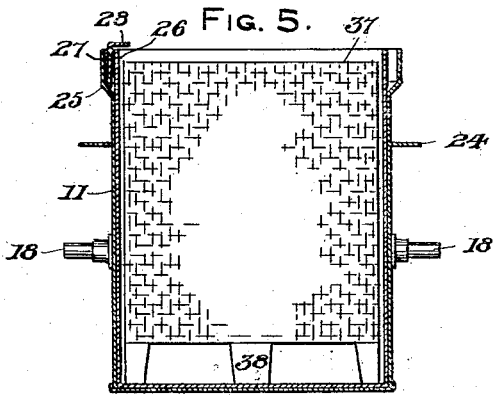
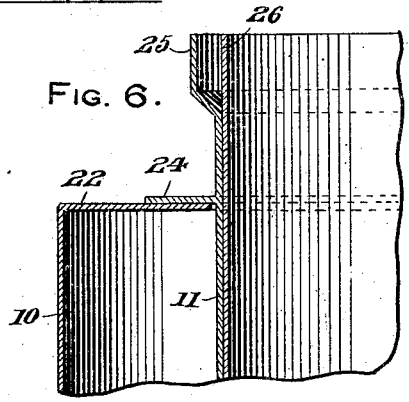
Inventor
L. Podlasek
By A. M. Wilson
Attorney

UNITED STATES PATENT OFFICE.

LAWRENCE PODLASEK, OF BERLIN, CONNECTICUT.

BOILER.

1,275,596.  Specification of Letters Patent.  Patented Aug. 13, 1918.

Application filed September 28, 1917. Serial No. 193,749.

*To all whom it may concern:*

Be it known that I, LAWRENCE PODLASEK, subject of the Emperor of Austria, residing at Berlin, in the county of Hartford and State of Connecticut, have invented certain new and useful Improvements in Boilers, of which the following is a specification.

This invention relates to certain new and useful improvements in boilers.

The primary object of the invention is the provision of a boiler that is especially adapted for household purposes such as in laundry use as well as for cooking purposes, its use being especially advantageous where large quantities of material are to be boiled such as in army use.

A further object of the device is the provision of a device providing a suitable heat pressure in connection with a container for receiving articles to be boiled thereby the device possessing great strength and utility.

A still further object of the device is the provision of a means for producing and utilizing heat for boiling purposes in connection with any desired articles, the arrangement being such that the articles may be readily removed from the device when desired while all parts of the latter are easily accessible for purposes of use and cleaning.

In the drawings forming a part of this application and in which like designating characters refer to corresponding parts throughout the several views, Figure 1 is a front elevation of the device with the doors open, Fig. 2 is a horizontal sectional view through the device and the article container thereof.

Fig. 3 is a similar sectional view taken upon a plane below the container.

Fig. 4 is a side elevation of the device with the container in its adjusted position.

Fig. 5 is a central sectional view of the container upon a reduced scale with the lid removed and Fig. 6 is an enlarged sectional view of an upper side portion of the device taken on line 6—6 of Fig. 1.

Referring more in detail to the drawings, it will be first noted that the device broadly consists of a stove or furnace 10 and a container 11 for articles to be boiled while a source of heat supply such as a furnace 12 is arranged in the stove 10 beneath the container 11 and a perforated tray 13 for receiving accumulations falling from the burner or furnace and shiftable by means of an exteriorly positioned crank 14 is arranged between the furnace 12 and the bottom 15 of the stove.

Perforated swinging doors 16 are provided for the stove 10 adapted for closing and opening a door-way 17 in the front side of the stove in the lower portion thereof and upon a plane adjacent the furnace 12 and tray 13.

A container 11 is preferably in the form of a cylindrical can and is arranged with oppositely projecting axles 18 which are trunnioned within inwardly extending socket members 19 carried by the sides of the stove 10, the said socket members being open at the top permitting the axles 18 to be removed from the sockets when it is desired to remove the container 11 from the stove 10.

The stove is also provided with upper doors 20 swingingly arranged at opposite sides of a cut-away portion 21 of the stove above and of greater dimensions than the door-way 17. An inwardly projecting annular rim 22 is provided at the top of the stove with a continuation or portion 23 thereof carried by each of the doors 20 upon which rim a projecting flange 24 of the container 11 is adapted to seat when the container is in its normal upright operative position. The sides of the container 11 are of double formation, the upper portion 25 of the outer wall of the container being separated from the inner wall 26 thereof adapted for the accommodation of the depending rim 27 of the lid or cover 28 of the container. A foraminous basket 37 arranged with legs 38 is removably provided within the container 11.

Handles 29 are arranged upon the lid 28 while swinging bolts 30 are carried by the sides of the container 11 adapted for engaging forks 31 of the lid while winged nuts 32 are arranged upon the bolts for overlying the said forks and maintaining the lid 28 secured upon the container. A plate 33 is carried by the lid 28 overlying a port (not shown) in the lid, the said plate being adapted to automatically rise for opening the port by means of the steam pressure when the same becomes excessive within the container 11. The complete operation of the device will be apparent in that the burner 12 will supply heat beneath the container 11 for boiling any articles arranged within the container while the doors 16 may be opened or closed at will and retained closed by means of a latch 34 whenever found desirable. Upon opening the doors 20, the container 11 may be forwardly tilted upon the socket members 19 to the position illustrated in Fig. 4 of the drawings so that the contents thereof may be removed by taking off the lid 28 or the entire container may be lifted out of the stove 10 through the top and forward cut-away portion 21 by means of the handles 29. An outlet 35 for the products of combustion is arranged at the rear side of the stove 10 while a suitable latch 36 is arranged for the upper doors 20. Large quantities of articles may be boiled within the container 11 and may be easily handled by means of this device.

What I claim as new is:—

1. A device of the class described comprising a stove having a cut-away front portion and an open top, an inwardly projecting rim at the top of the stove, swinging doors carried by the stove for the said cut-away portion arranged with rim sections forming a continuation of the rim of the stove when the doors are closed, inwardly projecting opposite sockets carried by the stove adjacent the cut-away portion, a container adapted for arrangement within said rim oppositely projecting axles upon the container removably journaled in the said sockets, a rim upon said container adapted for overlying said stove top rim when the container is arranged upright.

2. A device of the class described comprising a stove having a cut-away front portion and an open top, an inwardly projecting rim at the top of the stove, swinging doors carried by the stove for the said cut-away portion arranged with rim sections forming a continuation of the rim of the stove when the doors are closed, inwardly projecting opposite sockets carried by the stove adjacent the cut-away portion, a container adapted for arrangement within said rim, oppositely projecting axles upon the container removably journaled in the said sockets, a rim upon said container adapted for overlying said stove top rim when the container is arranged upright and overlying the rim sections of the doors, the container being arranged with its rim out of contact with the rim of said stove top and forwardly inclined through the cutaway portion of the stove with said doors open when the container is in its emptying position.

In testimony whereof I affix my signature.

LAWRENCE PODLASEK.

Copies of this patent may be obtained for five cents each, by addressing the "Commissioner of Patents, Washington, D. C."